(12) United States Patent
Mitsuo et al.

(10) Patent No.: US 11,084,535 B2
(45) Date of Patent: Aug. 10, 2021

(54) STEERING SUPPORT STRUCTURE

(71) Applicant: TOYOTA JIDOSHA KABUSHIKI KAISHA, Aichi-ken (JP)

(72) Inventors: Tetsu Mitsuo, Nisshin (JP); Masaya Ikeda, Nisshin (JP); Yukihiko Nakagawa, Nisshin (JP); Osamu Okitsu, Mishima (JP); Yuuichi Suzue, Hadano (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 99 days.

(21) Appl. No.: 16/575,391

(22) Filed: Sep. 19, 2019

(65) Prior Publication Data
US 2020/0094882 A1 Mar. 26, 2020

(30) Foreign Application Priority Data
Sep. 21, 2018 (JP) .............................. JP2018-177181

(51) Int. Cl.
*B62D 25/14* (2006.01)
*B62D 1/16* (2006.01)
*B62D 25/20* (2006.01)

(52) U.S. Cl.
CPC .............. *B62D 25/145* (2013.01); *B62D 1/16* (2013.01); *B62D 25/2009* (2013.01)

(58) Field of Classification Search
CPC ..... B62D 25/145; B62D 1/16; B62D 25/2009
USPC ............................................. 296/193.02, 70
See application file for complete search history.

(56) References Cited

U.S. PATENT DOCUMENTS

| 8,393,671 B2* | 3/2013 | Watanabe ............ B62D 25/147 |
| | | 296/193.02 |
| 9,162,708 B2* | 10/2015 | Matsushita .............. B62D 1/16 |
| 9,340,236 B2* | 5/2016 | Kong ...................... B62D 7/224 |
| 2012/0049574 A1 | 3/2012 | Atsumi et al. |

FOREIGN PATENT DOCUMENTS

| JP | 2012-46002 A | 3/2012 |
| JP | 2017-24471 A | 2/2017 |

* cited by examiner

*Primary Examiner* — Joseph D. Pape
(74) *Attorney, Agent, or Firm* — Hauptman Ham, LLP

(57) ABSTRACT

A gusset is joined to an instrument panel reinforcement and a floor brace. The instrument panel reinforcement includes a D seat rear beam extending from a portion to be joined to the floor brace to a portion for supporting the steering column. The D seat rear beam includes a D seat upper beam having a hat-shaped cross section open toward a lower side. The gusset includes a reinforcement joint portion that is joined to the D seat upper beam to form a closed cross section.

4 Claims, 23 Drawing Sheets

CROSS-SECTIONAL VIEW TAKEN ALONG LINE G-G

CROSS-SECTIONAL VIEW TAKEN ALONG LINE H-H

CROSS-SECTIONAL VIEW TAKEN ALONG LINE B-B

STEERING SUPPORT STRUCTURE

CROSS REFERENCE TO RELATED APPLICATION

This application claims priority to Japanese Patent Application No. 2018-177181, filed on Sep. 21, 2018, which is incorporated herein by reference in its entirety.

TECHNICAL FIELD

The present disclosure relates to a steering support structure provided in a vehicle.

BACKGROUND

Vehicles are provided with an instrument panel reinforcement serving as a steering support structure for the vehicle. For example, as exemplarily illustrated in FIG. 22 and disclosed in JP 2012-46002 A, a steering column 206 is attached to an instrument panel reinforcement 200, via a holding member such as a steering bracket 204. A steering wheel 208 is provided at the rear end of the steering column 206 in a vehicle front and rear direction.

The instrument panel reinforcement 200 is a pipe member extending in a vehicle width direction, and having both ends, in the vehicle width direction, fixed to frame members such as front pillars 202, 202. With this configuration, the instrument panel reinforcement 200 mainly supports (struts) the steering wheel 208 in the vehicle width direction.

Furthermore, a floor brace 210 and a cowl to brace 212 are attached to the instrument panel reinforcement 200. The cowl to brace 212 is a reinforcing member extending in a vehicle front and rear direction, and having a front end fixed to a cowl panel (not illustrated) of the vehicle and a rear end fixed to the instrument panel reinforcement 200. With this configuration, the cowl to brace 212 mainly supports the steering wheel 208 in the vehicle front and rear direction (via the instrument panel reinforcement 200).

The floor brace 210 is a reinforcing member extending in a vehicle upper and lower direction, and having an upper end fixed to the instrument panel reinforcement 200 and a lower end fixed to a floor tunnel 214. With this configuration, the floor brace 210 mainly supports the steering wheel 208 in the vehicle upper and lower direction (via the instrument panel reinforcement 200).

SUMMARY

During steering of the vehicle, a load in the vehicle upper and lower direction may be input from the steering wheel 208 to the instrument panel reinforcement 200. This is the case, for example, when the vehicle travels on a rough road forcing the driver to hold the steering wheel 208 while bearing against vibrations in the vehicle upper and lower direction (vertical vibrations).

At this time, a load is input from the steering wheel 208 to the instrument panel reinforcement 200 via the steering column 206. Specifically, as exemplarily illustrated in FIG. 23, upon receiving a downward load from the steering wheel 208, the instrument panel reinforcement 200 deforms to be bent about the front pillar 202 and the floor brace 210, as indicated by one-dot chain line in FIG. 23.

A reduction of the amount of bending deformation of the instrument panel reinforcement 200 leads to an increase in a so-called steering support rigidity. In view of this, the allowable amount of bending deformation of the instrument panel reinforcement is managed according to the type of vehicle. For example, the above-mentioned allowable amount is set to be smaller for luxury car models.

However, a higher cost is required for manufacturing an instrument panel reinforcement with flexural rigidity varying; that is, with thickness and diameter varying, among vehicle models in accordance with the allowable bending deformation of the instrument panel reinforcement.

Thus, the present disclosure aims to provide a steering support structure with which parts can be shared as much as possible among a plurality of vehicle models different from each other in an allowable amount of bending deformation of the instrument panel reinforcement in the upper and lower direction.

The present disclosure relates to a steering support structure. The structure includes an instrument panel reinforcement, a floor brace, and a gusset. The instrument panel reinforcement supports a steering column, extends in the vehicle width direction, and has both ends in the vehicle width direction fixed to frame members of a vehicle. The floor brace extends in a vehicle upper and lower direction, and has an upper end joined to the instrument panel reinforcement and a lower end joined to a floor member. The gusset is a diagonal member joined to the instrument panel reinforcement and the floor brace. The instrument panel reinforcement includes a D seat rear beam extending from a portion to be joined to the floor brace to a portion for supporting the steering column. The D seat rear beam includes a D seat upper beam having a hat-shaped cross section open toward a lower side. The gusset includes a reinforcement joint portion that is joined to the D seat upper beam to form a closed cross section.

With the above configuration, the flexural rigidity in the section of the instrument panel reinforcement between the steering column and the floor brace changes in accordance with a change in the closed cross-sectional structure formed by the reinforcement joint portion of the gusset and the D seat upper beam of the instrument panel reinforcement. Thus, the flexural rigidity is determined based on the moment of inertia of the area of the closed cross-sectional structure. The moment of inertia of the area with respect to a load in the upper and lower direction can be adjusted in accordance with the height of the closed cross-sectional structure in the vehicle upper and lower direction. Specifically, the moment of inertia of the area of the closed cross-sectional structure and thus the flexural rigidity in the upper and lower direction can be changed by merely changing the height of a portion of the closed cross-sectional structure corresponding to the reinforcement joint portion of the gusset in the vehicle upper and lower direction; that is, without making any change to the other components.

Also in the above disclosure, the gusset may include a brace joint portion and an intermediate portion. The brace joint portion extends in the vehicle upper and lower direction and is joined to the floor brace. The intermediate portion connects the reinforcement joint portion and the brace joint portion to each other and is inclined to extend in the vehicle width direction and the vehicle upper and lower direction. In this configuration, a portion where the intermediate portion and the brace joint portion are connected to each other may have a curved shape.

With the above configuration, the portion where the intermediate portion inclined to extend in the vehicle width direction and in the vehicle upper and lower direction and the brace joint portion extending in the vehicle upper and lower direction are connected can have an arched curved shape; that is, a curvature shape which is less likely to have the stress concentrated compared with a case where the portions intersect each other linearly.

Also, in the above disclosure, the reinforcement joint portion may have a hat-shaped cross section open toward an upper side.

With the above configuration, the moment of inertia of the area of the closed cross-sectional structure and thus the flexural rigidity in the upper and lower direction can be changed only by changing the height in the vehicle upper and lower direction (the height of the hat-shaped cross section of the reinforcement joint portion); that is, without making any change to the other components.

The present disclosure enables parts of the steering support structure to be shared as much as possible among a plurality of vehicle types different from each other in an allowable amount of bending deformation of the instrument panel reinforcement in the vertical direction.

BRIEF DESCRIPTION OF DRAWINGS

The present disclosure will be further described with reference to the accompanying drawings, wherein like reference numerals refer to like parts in the several views, and wherein.

DESCRIPTION OF EMBODIMENTS

Figure 1:
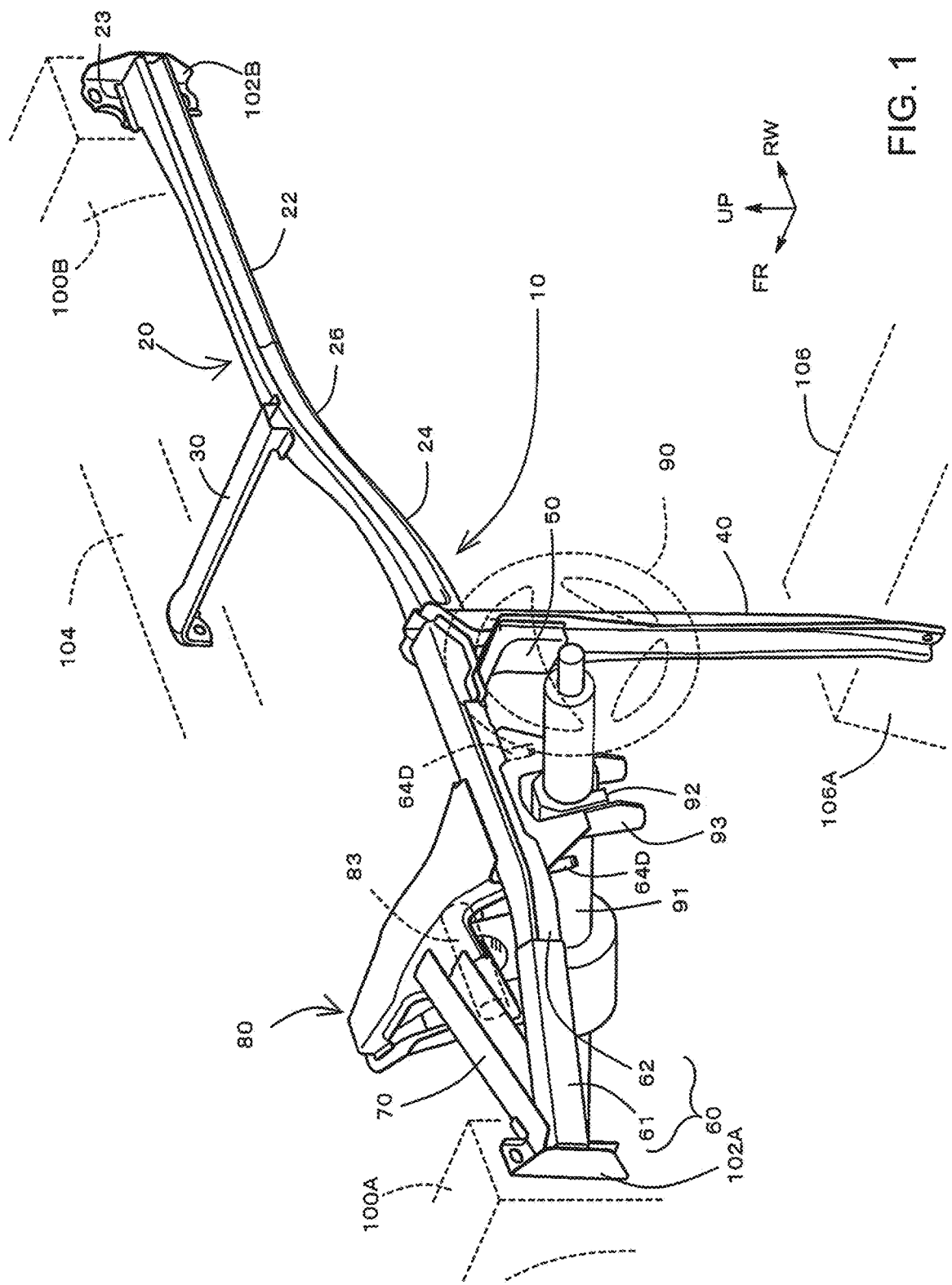
FIG. 1 is a diagram exemplarily illustrating a steering support structure according to the present embodiment.

FIG. 1 illustrates a steering support structure according to the present embodiment. In FIGS. 1 to 21, an axis denoted by a sign FR, an axis denoted by a sign RW, and an axis denoted by a sign UP respectively represent a front and rear direction, a width direction, and an upper and lower direction of a vehicle. The sign FR is an abbreviation of Front. A vehicle forward direction is assumed to be the positive direction on the vehicle longitudinal axis FR. The sign RW is an abbreviation of Right Width. A right width direction is assumed to be the positive direction on the vehicle width axis RW. An upward direction is assumed to be the positive direction on the vehicle upper and lower axis UP. As illustrated in FIG. 1, the vehicle longitudinal axis (FR axis), the vehicle width axis (RW axis), and the vehicle upper and lower axis (UP axis) are orthogonal to each other.

Figure 2:
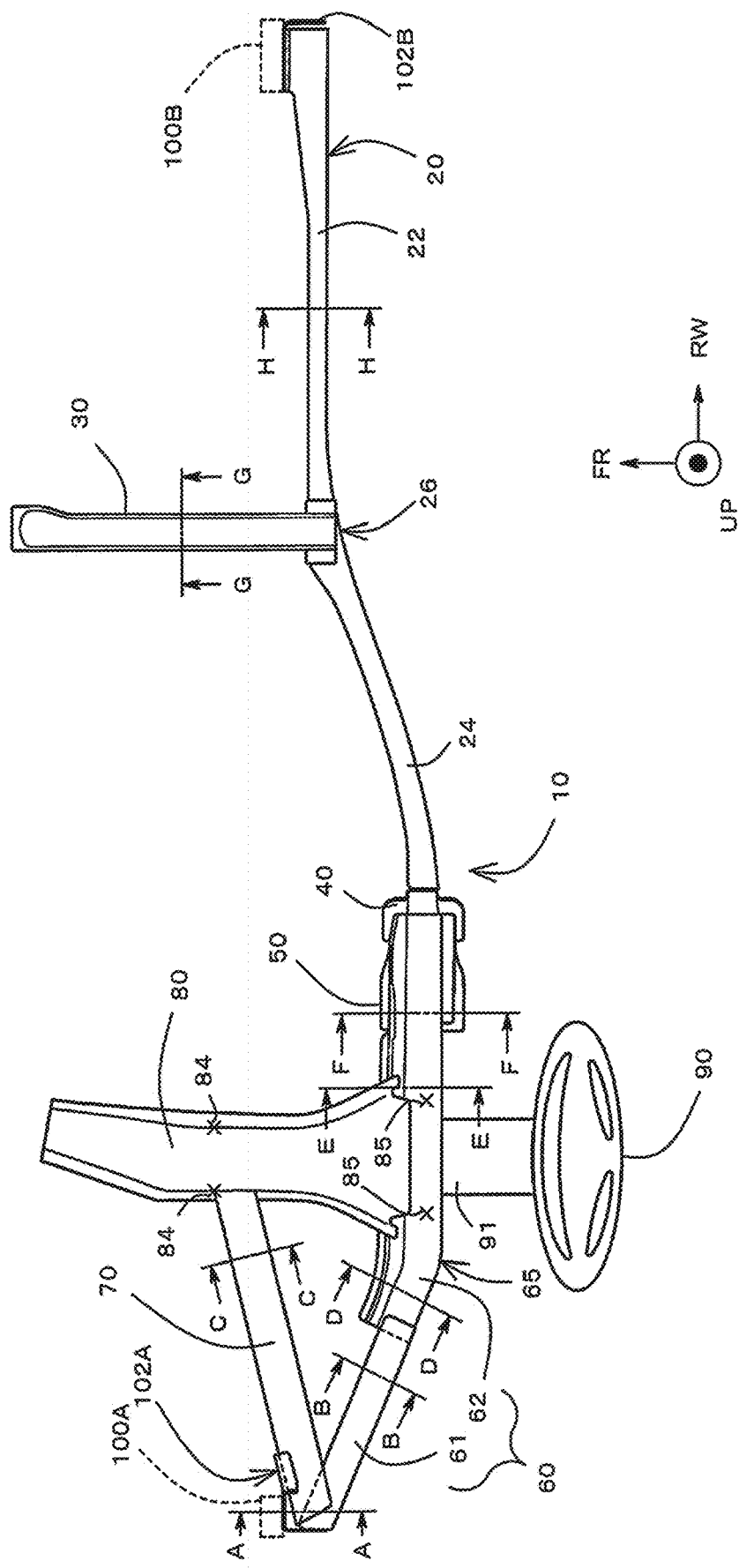
FIG. 2 is a plan view exemplarily illustrating the steering support structure according to the present embodiment.

FIG. 1 is a perspective view of a steering support structure for a left-hand drive vehicle, and FIG. 2 is a plan view of the same. An instrument panel separating a steering wheel 90 and the steering support structure from each other is omitted in the figure.

The steering support structure according to the present embodiment includes an instrument panel reinforcement 10, a steering bracket 80, a cowl to brace 30, and a floor brace 40.

The instrument panel reinforcement 10 according to the present embodiment supports a steering column 91, extends in the vehicle width direction, and has its both ends fixed to frame members of the vehicle. For example, the instrument panel reinforcement 10 has both ends, in the vehicle width direction, fastened to front lower pillars 100A and 100B, serving as the frame members, via front pillar brackets 102A and 102B. With both ends of the instrument panel reinforcement 10 in the vehicle width direction fixed to the frame members, the instrument panel reinforcement 10 mainly supports the steering column 91 in the vehicle width direction.

The instrument panel reinforcement 10 is fixed to the floor brace 40 and the cowl to brace 30. As described later, the instrument panel reinforcement 10 is supported by the floor brace 40 in the vehicle upper and lower direction. The instrument panel reinforcement 10 is supported by the cowl to brace 30 in the vehicle front and rear direction.

The instrument panel reinforcement 10 according to the present embodiment is not a single member such as a conventional tuboid pipe, and includes a plurality of members (parts). Specifically, the instrument panel reinforcement 10 includes a P seat beam 20, a D seat rear beam 60, a D seat front beam 70, and a gusset 50.

Referring to FIGS. 1 and 2, in the instrument panel reinforcement 10 according to the present embodiment, the D seat rear beam 60 and the P seat beam 20 both extend in the vehicle width direction with the floor brace 40 provided therebetween. The steering column 91 is supported by the D seat rear beam 60.

Figure 12:
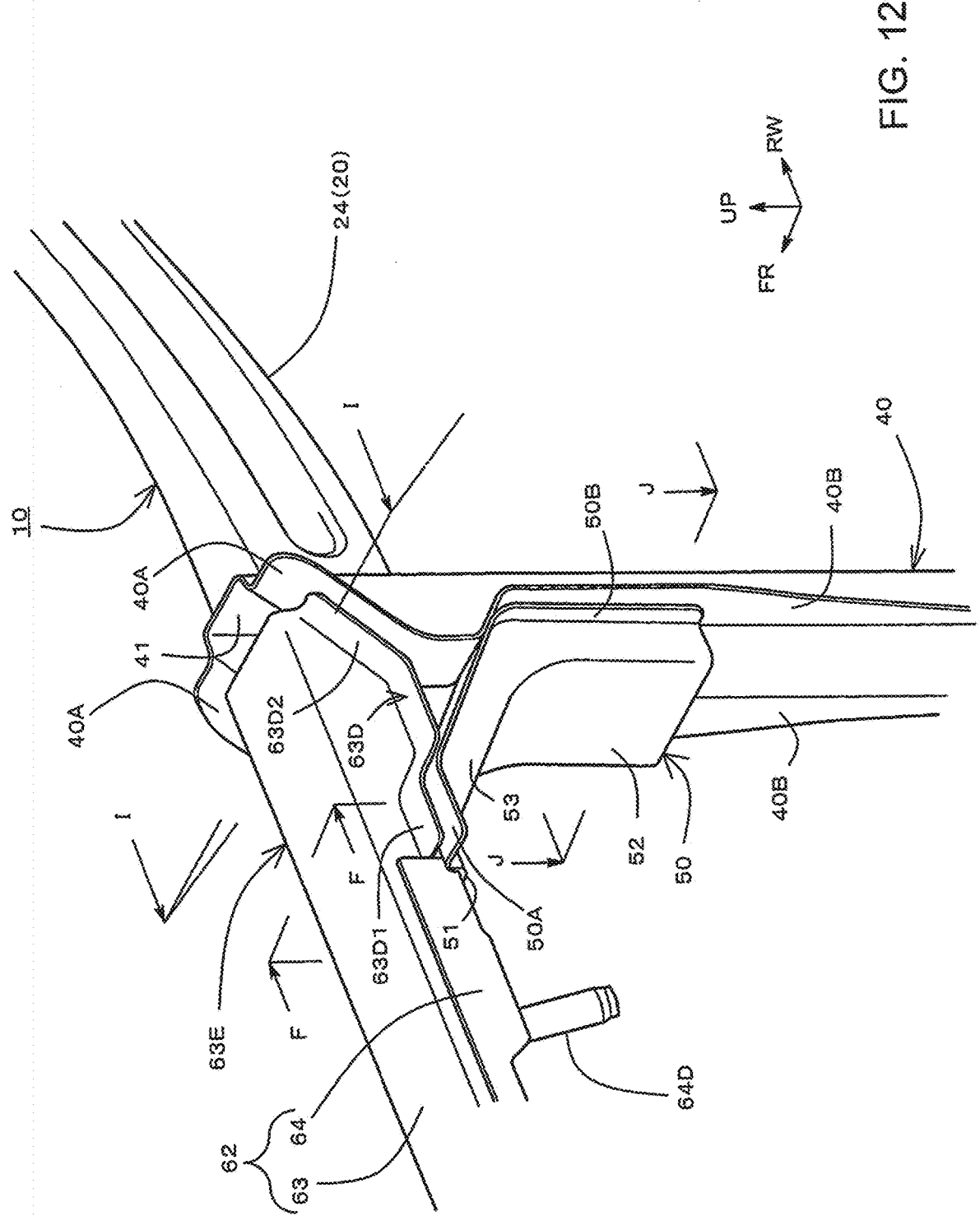
FIG. 12 is an enlarged perspective view exemplarily illustrating a portion where a second D seat rear beam, a floor brace, and a gusset in the steering support structure according to the present embodiment are joined to each other.
Figure 15:
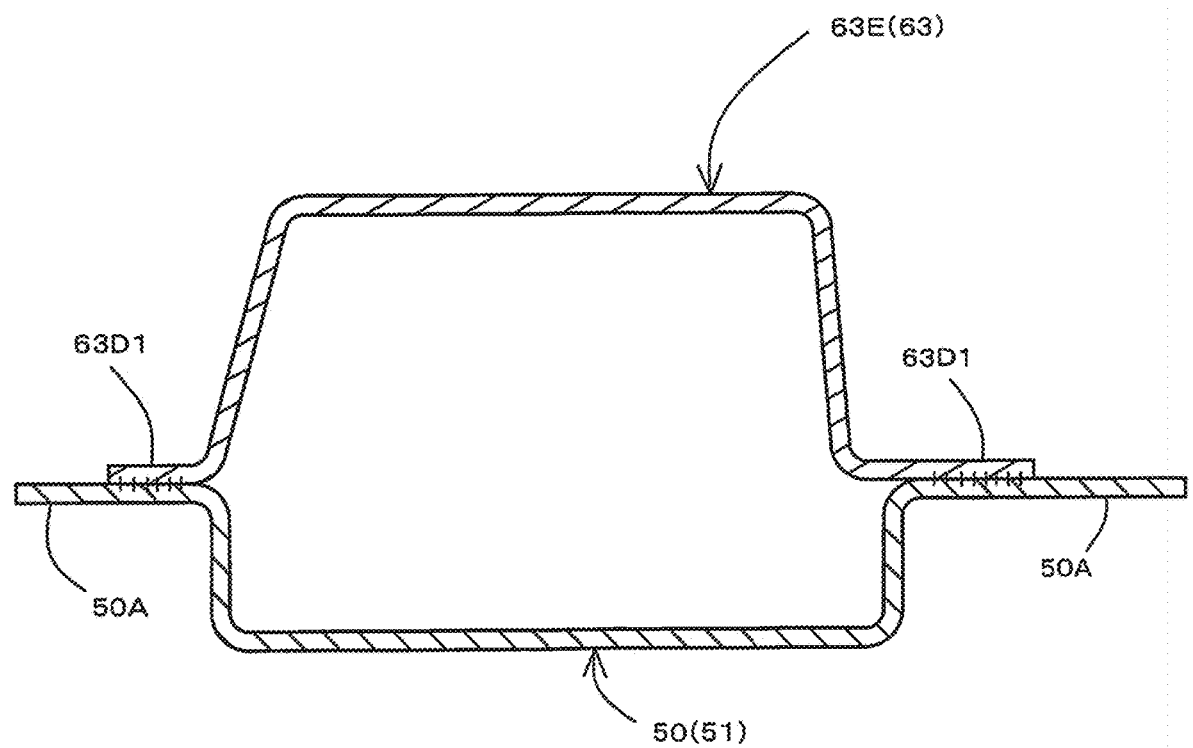
FIG. 15 is a cross-sectional view taken along line F-F in FIGS. 2 and 12.

The gusset 50 serving as a diagonal member is joined to the D seat rear beam 60 of the instrument panel reinforcement 10 which is a beam member (horizontal beam) extending in the vehicle width direction and to the floor brace 40 which is a beam member (vertical beam) extending in the vehicle upper and lower direction. As illustrated in FIGS. 12 and 15, which will be described later, an extension portion 63E of a D seat upper beam 63 of the D seat rear beam 60 has a hat-shaped cross section open toward the lower side. A reinforcement joint portion 51 of the gusset 50 has a hat-shaped cross section open toward the upper side. These portions are joined to each other so that a closed cross section is formed.

In the steering support structure according to the present embodiment, the flexural rigidity of the D seat rear beam 60 is determined according to the above-described closed cross-sectional structure. As will be described later, the flexural rigidity of the D seat rear beam 60, against a load in the upper and lower direction in particular, can be adjusted by merely adjusting the height of the reinforcement joint portion 51 of the gusset 50 in the vehicle upper and lower direction.

As described above, with the steering support structure according to the present embodiment, the flexural rigidity of the D seat rear beam 60 can be changed by merely adjusting the height of the reinforcement joint portion 51 of the gusset 50 in the vehicle upper and lower direction, and thus without making changes to the other components of the instrument panel reinforcement 10 such as the D seat upper beam 63, for example. Therefore, components of the steering support structure other than the gusset 50 can be shared among a plurality of models different from each other in the allowable amount of bending deformation in a section between the steering column 91 and the floor brace 40 in the instrument panel reinforcement 10.

<Structure Around P Seat>

The structure of the instrument panel reinforcement 10 around a passenger's seat (P seat) will be described with reference to FIGS. 3 to 5. The instrument panel reinforcement 10 includes the P seat beam 20 as a member around the P seat. In addition, the cowl to brace 30 is fixed to the P seat beam 20.

Referring to FIGS. 1, 2, 3 and 4, the cowl to brace 30 is a reinforcing member (brace) extending in the vehicle front and rear direction, and has a ridgeline, at which the load is mainly received (strut), extending substantially along the vehicle front and rear direction. The cowl to brace 30 has a front end fixed to a cowl panel 104 (see FIG. 1) serving as a panel member of the vehicle, and a rear end fixed to the P seat beam 20.

Figure 3:
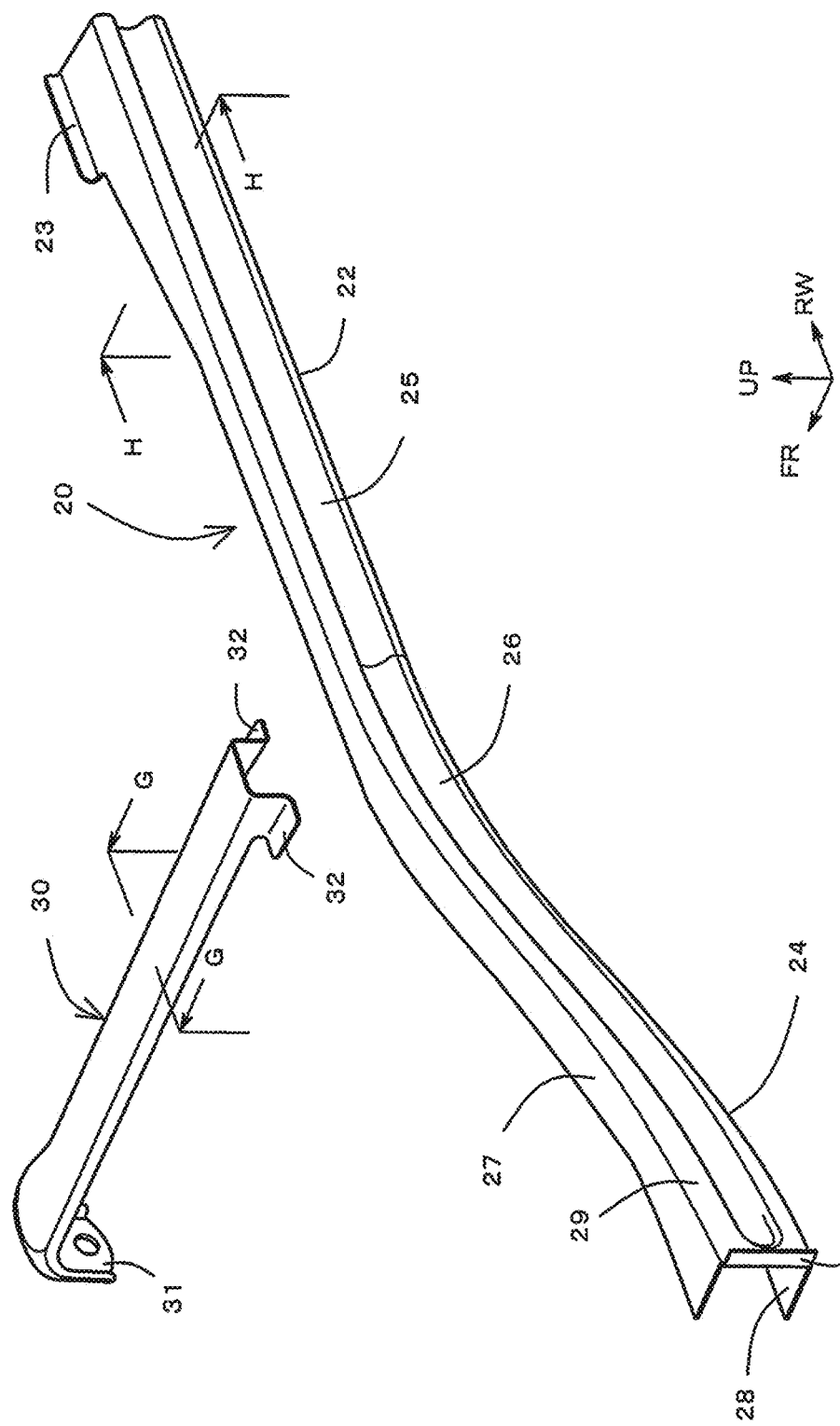
FIG. 3 is an exploded perspective view illustrating a P seat beam of an instrument panel reinforcement and a cowl to brace in the steering support structure according to the present embodiment.
Figure 4:
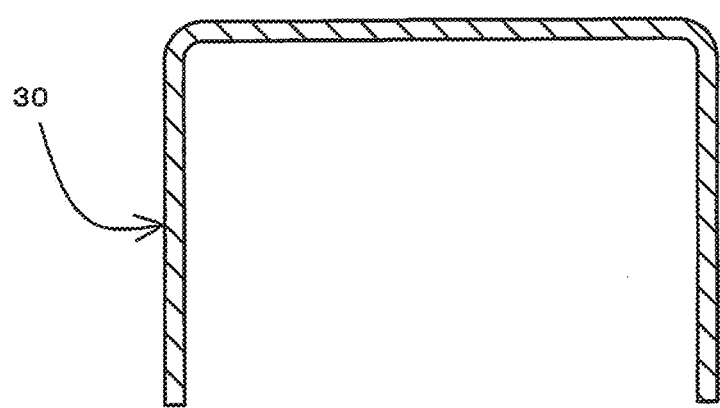
FIG. 4 is a cross-sectional view taken along line G-G in FIGS. 2 and 3.
Figure 4:
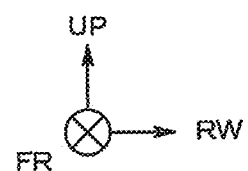
Figure 5:
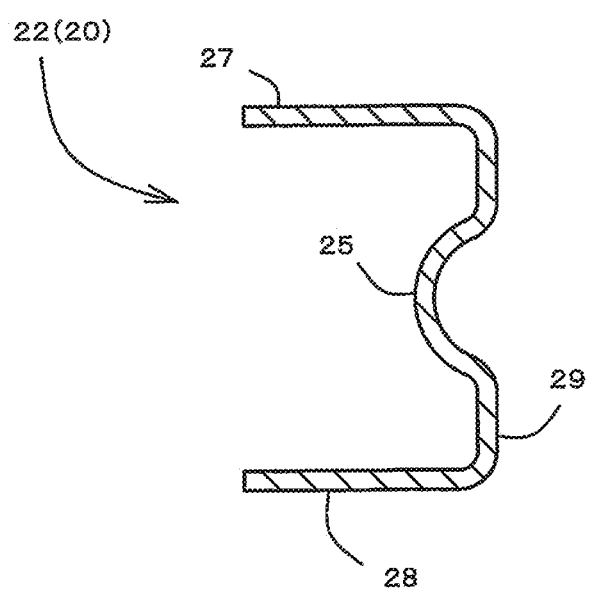
FIG. 5 is a cross-sectional view taken along line H-H in FIG. 2.
Figure 5:
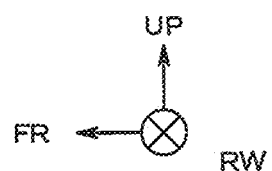

FIG. 4 is an exemplary cross-sectional view taken along line G-G in FIG. 2. The cowl to brace 30 is a member having a squarish U-shaped cross section open toward the lower side in the vehicle upper and lower direction, and has a front flange 31 (see FIG. 3), facing the vehicle front and rear direction, formed at the front end. Rear flanges 32 and 32 facing the vehicle upper and lower direction are formed at the rear end. The front flange 31 and the cowl panel 104 (see FIG. 1) are fastened to each other by fastening means such as a bolt and nut. The rear flanges 32 and 32 are joined to an upper wall portion 27 of the P seat beam 20 by welding or the like.

Referring to FIG. 3, the P seat beam 20 extends substantially in the vehicle width direction, with a ridgeline, where a load is mainly received (strut), extending substantially in the vehicle width direction. FIG. 5 illustrates an exemplary cross-sectional view taken along line H-H in FIG. 3. The P seat beam 20 is a member having a squarish U-shaped cross section open toward the front side in the vehicle front and rear direction, and includes the upper wall portion 27 that extends in the vehicle front and rear direction and is provided on the upper side in the vehicle upper and lower direction, and a lower wall portion 28 that similarly extends in the vehicle front and rear direction and is provided on the lower side in the vehicle upper and lower direction. Furthermore, a side wall portion 29 is provided that extends in the vehicle upper and lower direction and connects the upper wall portion 27 and the lower wall portion 28 to each other. Referring to FIG. 3, a bead 25 is formed entirely over the side wall portion 29 in the vehicle width direction.

Referring to FIG. 3, an inner flange 21 facing the vehicle width direction is formed at an inner end portion of the side wall portion 29 of the P seat beam 20 in the vehicle width direction. The inner flange 21 is joined to a bottom wall portion 41 (see FIG. 13) of the floor brace 40 by welding or the like.

Referring to FIG. 3, outer flanges 23 facing the vehicle front and rear direction are formed at outer end portions of the upper wall portion 27 and the lower wall portion 28 of the P seat beam 20 in the vehicle width direction. Referring to FIG. 1, the outer end of P seat beam 20 in the vehicle width direction is fixed to the front lower pillar 100B, which is the frame member on the passenger's seat side, via the outer flange 23 and a front pillar bracket 102B.

Referring to FIG. 2, the P seat beam 20 has a boomerang-like curved structure in plan view. Specifically, a side end portion 22 and an inclined portion 24 are respectively formed on the outer and the inner sides of the P seat beam 20 in the vehicle width direction. Furthermore, a bent portion 26 is formed in the P seat beam 20 to serve as a boundary part between the side end portion 22 and the inclined portion 24.

<Structure Around D Seat>

A structure of the instrument panel reinforcement 10 around the driver's seat (D seat) will be described with reference to FIG. 1, FIG. 2, and FIG. 6 to FIG. 11. The instrument panel reinforcement 10 includes the D seat rear beam 60 and the D seat front beam 70 as members around the D seat. The D seat rear beam 60 is provided further on the rear side than the D seat front beam 70 in the vehicle front and rear direction.

Figure 6:
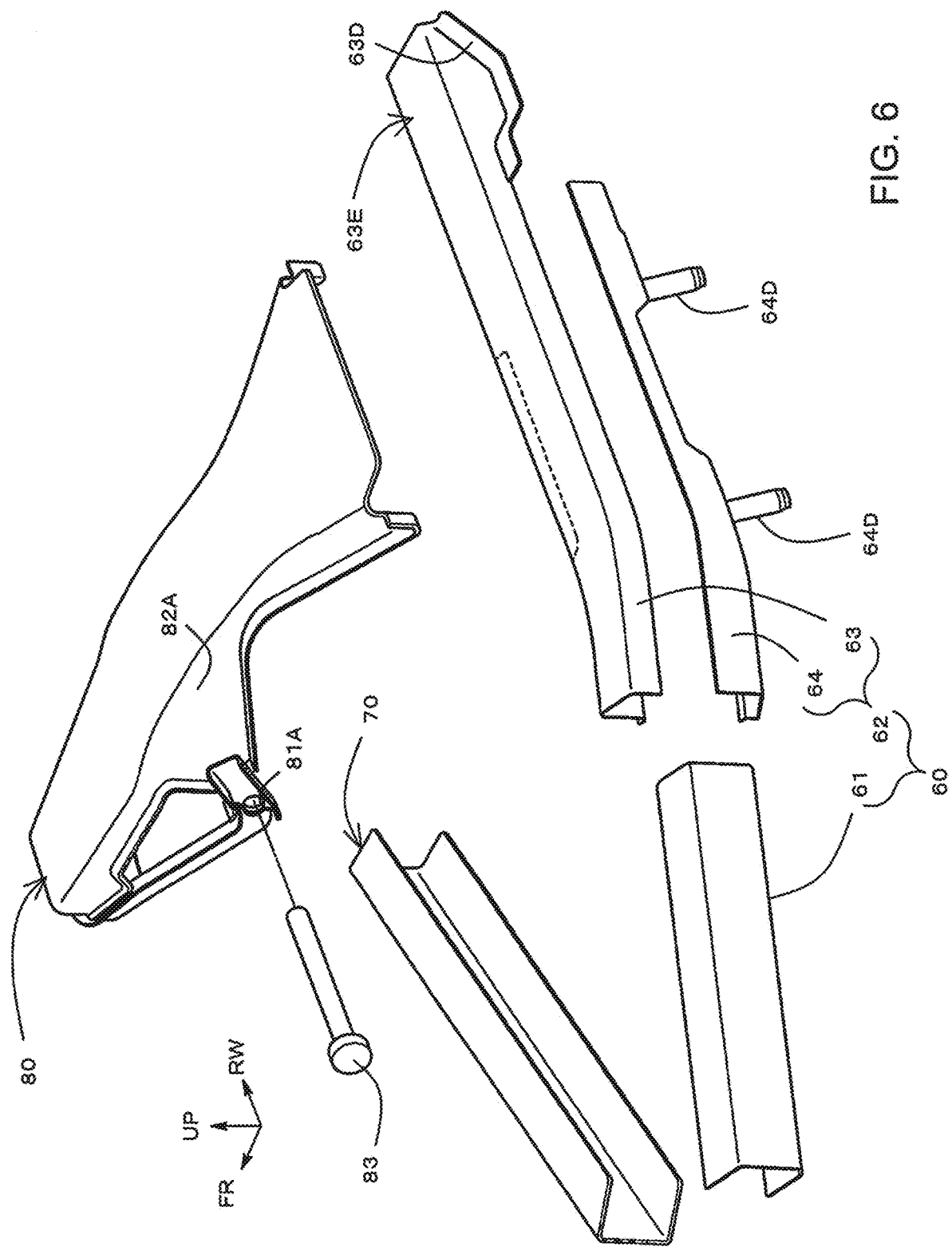
FIG. 6 is an exploded perspective view exemplarily illustrating members forming a D seat beam and a steering bracket in the instrument panel reinforcement according to the present embodiment.

Referring to FIGS. 1, 2, and 6, the D seat front beam 70 has an outer side end in the vehicle width direction fixed to the front lower pillar 100A, serving as a frame member on the driver's seat side, via the front pillar bracket 102A. Furthermore, the D seat front beam 70 has an inner end in the vehicle width direction fixed to a side wall 82A of the steering bracket 80.

Figure 9:
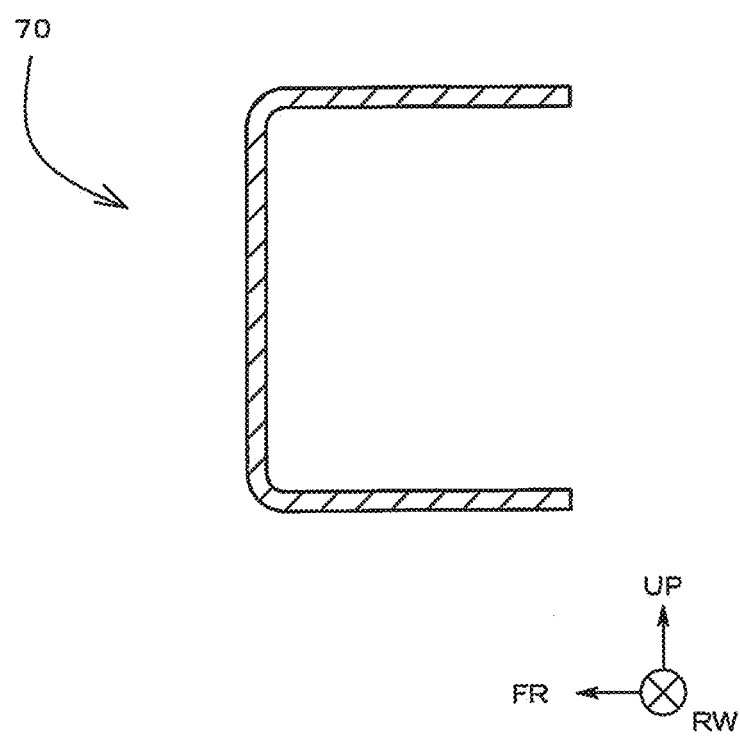
FIG. 9 is a cross-sectional view taken along line C-C in FIG. 2.

FIG. 9 is a cross-sectional view taken along line C-C in FIG. 2. Referring to this figure, the D seat front beam 70 is formed of a grooved member having a squarish U-shaped cross section open toward the rear side in the vehicle front and rear direction.

Referring to FIG. 2, the D seat front beam 70 is obliquely arranged in plan view. More specifically, the D seat front beam 70 extends from the outer end portion in the vehicle width direction to the inner end portion in the vehicle width direction; that is, extends in an inclined manner toward the inner side in the vehicle width direction and toward the front side in the vehicle front and rear direction.

Referring to FIGS. 1, 2 and 6, the D seat rear beam 60 extends toward the outer side in the vehicle width direction, over a section between a portion joined to the floor brace 40 and a supported portion of the steering column 91. The D seat rear beam 60 includes a first D seat rear beam 61 and a second D seat rear beam 62. The first D seat rear beam 61 is provided further on the outer side than the second D seat rear beam 62 in the vehicle width direction.

The first D seat rear beam 61 has an end in the vehicle width direction fixed to the front lower pillar 100A, which is the frame member on the driver's seat side, via the front pillar bracket 102A. The inner end of the first D seat rear beam 61 in the vehicle width direction is connected to the outer end of the second D seat rear beam 62 in the vehicle width direction. For example, the inner end portion of the first D seat rear beam 61 in the vehicle width direction is overlapped on and joined to the outer end portion of the second D seat rear beam 62 in the vehicle width direction by welding or the like.

The first D seat rear beam 61 is disposed obliquely in plan view. More specifically, the first D seat rear beam 61 extends from the outer end in the vehicle width direction joined to the front lower pillar 100A to the inner end in the vehicle width direction; that is, extends in an inclined manner toward the inner side in the vehicle width direction and toward the rear side in the vehicle front and rear direction.

As described above, the first D seat rear beam 61 extends in an inclined manner toward the vehicle rear side from the outer end in the vehicle width direction, and the D seat front beam 70 extends in an inclined manner toward the vehicle front side from the outer end in the vehicle width direction. Thus, the D seat front beam 70 and the first D seat rear beam 61 establish a so-called V-shaped structure to support the steering column 91.

Figure 7:
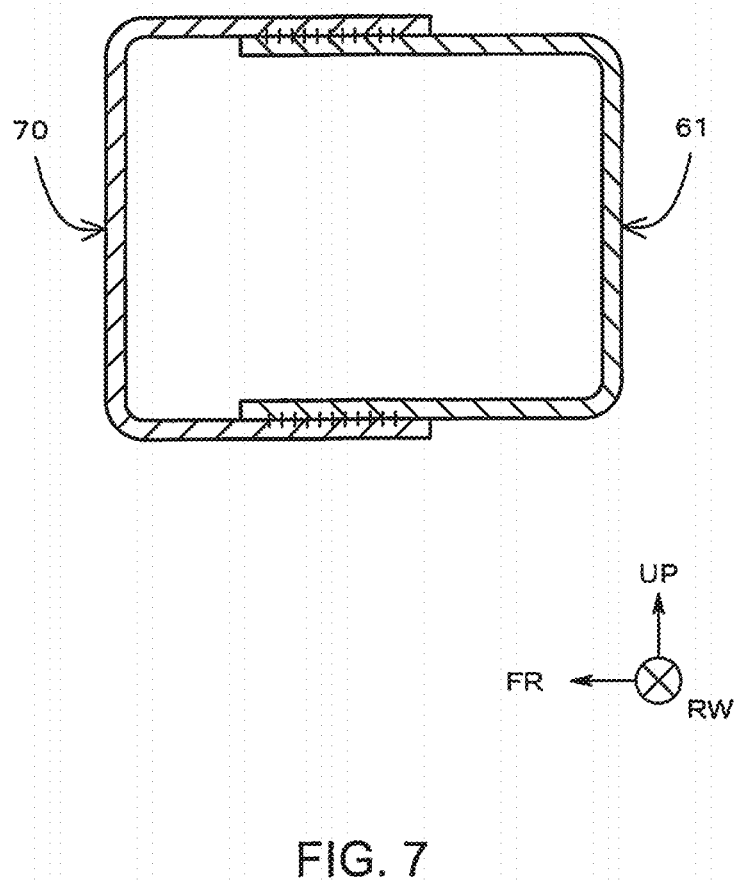
FIG. 7 is a cross-sectional view taken along line A-A in FIG. 2.
Figure 8:
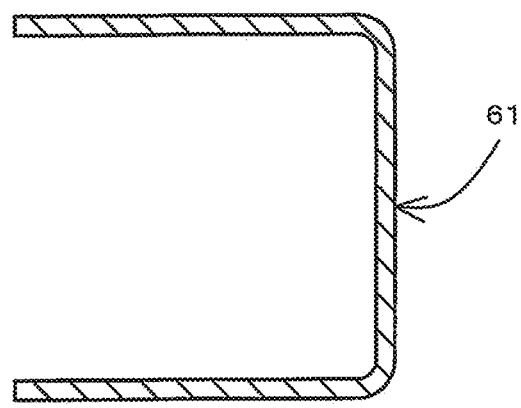
FIG. 8 is a cross-sectional view taken along line B-B in FIG. 2.
Figure 8:
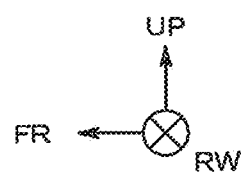

FIG. 8 is an exemplary cross-sectional view taken along line B-B in FIG. 2. The first D seat rear beam 61 is formed of a grooved member having a squarish U-shaped cross section opened toward the front side in the vehicle front and rear direction. FIG. 7 is a cross-sectional view taken along line A-A in FIG. 2. In each cross-sectional view, the portion where joining by welding or the like takes place is indicated by hatching with vertical lines (∥∥). The outer end portion of the D seat front beam 70 in the vehicle width direction and the outer end portion of the first D seat rear beam 61 in the vehicle width direction are overlapped and joined to each other by welding or the like. Thus, the outer end portions of the D seat rear beam 60 and the D seat front beam 70 in the vehicle width direction form a closed cross section.

As described above, the closed cross-sectional structure is provided in the outer end portions of the D seat rear beam 60 and the D seat front beam 70, joined to the front lower pillar 100A serving as a frame member of the vehicle, in the vehicle width direction. Thus, the mounting rigidity of the instrument panel reinforcement 10 with respect to the front lower pillar 100A is improved. For example, with the closed cross-sectional structure, torsional deformation of the outer end portions of the D seat rear beam 60 and the D seat front beam 70 in the vehicle width direction relative to the front lower pillar 100A can be reduced.

Referring to FIGS. 1, 2 and 6, the second D seat rear beam 62 is connected to the inner end of the first D seat rear beam 61 in the vehicle width direction and extends in the vehicle width direction. Specifically, the second D seat rear beam 62 is provided with a bent portion 65 (see FIG. 2) that is further on the inner side than the outer end portion in the vehicle width direction joined to the inner end of the first D seat rear beam 61 in the vehicle width direction. The second D seat rear beam 62 extends from the bent portion 65 in the vehicle width direction. Referring to FIGS. 1, 2 and 6, stud bolts 64D, 64D are provided at this portion extending in the vehicle width direction.

Referring to FIG. 1, a fixed bracket 93 is fastened to the stud bolts 64D, 64D. A movable bracket 92 is accommodated inside the fixed bracket 93. The steering column 91 is inserted into the movable bracket 92. The movable bracket 92 is displaceable in the vehicle upper and lower direction relative to the fixed bracket 93.

The stud bolts 64D, 64D are inserted into openings (not illustrated) formed in the fixed bracket 93. The fixed bracket 93 is supported and fixed on the second D seat rear beam 62 via the stud bolts 64D, 64D, with nuts (not illustrated) screwed onto shaft ends of the stud bolts 64D, 64D. As a result, portions where the stud bolts 64D, 64D are provided serve as second column support points 85 (see FIG. 2) for supporting the steering column 91.

The steering bracket 80 is provided with a first column support point 84. Thus, the steering bracket 80 is provided on the front side of the stud bolts 64D, 64D in the vehicle front and rear direction. Referring to the broken line in FIG. 6 and FIG. 11 that is a cross-sectional view taken along line E-E in FIG. 2, the steering bracket 80 has a rear end in the vehicle front and rear direction joined to the second D seat rear beam 62 by welding or the like. Furthermore, the steering bracket 80 extends in the vehicle front and rear direction from the rear end.

Referring to FIG. 6, a tilt shaft opening 81A is formed through the side wall 82A of the steering bracket 80 in the vehicle width direction. Furthermore, a through hole (not shown) corresponding to the tilt shaft opening 81A is formed, in the vehicle width direction through a portion on the front side of the steering column 91 in the vehicle front and rear direction.

After the tilt shaft opening 81A of the steering bracket 80 and the through hole of the steering column 91 are aligned (axially alignment), a tilt shaft bolt 83 is inserted into these openings. The shaft end of the tilt shaft bolt 83 is screwed into a nut.

Thus, the steering column 91 is supported by the steering bracket 80 via the tilt shaft bolt 83 to be rotatable in the vehicle upper and lower direction. Thus, the portions of the steering bracket 80 where the tilt shaft bolt 83 is inserted correspond to the first column support points 84, 84.

Figure 10:
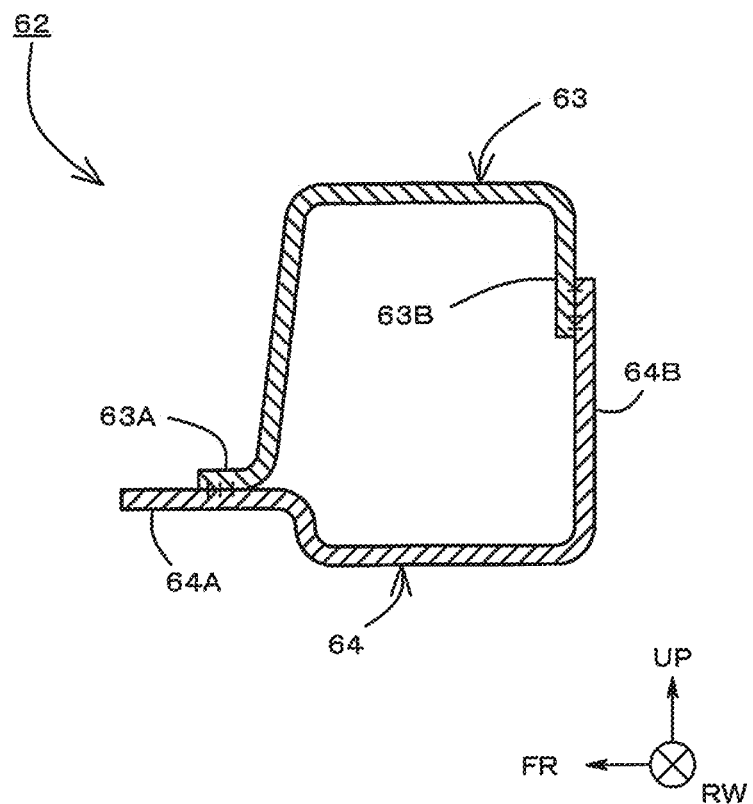
FIG. 10 is a cross-sectional view taken along line D-D in FIG. 2.

Referring to FIG. 6, the second D seat rear beam 62 includes the D seat upper beam 63 which is an upper member and a D seat lower beam 64 which is a lower member. FIG. 10 is a cross-sectional view taken along line D-D in FIG. 2; that is, an exemplary cross-sectional view of the outer end portions of the D seat upper beam 63 and the D seat lower beam 64 in the vehicle width direction. The D seat upper beam 63 is formed in a substantially squarish U shape open toward the lower side in the vehicle upper and lower direction. Furthermore, a flange 63A for joining is formed on the front side of the D seat upper beam 63 in the vehicle front and rear direction. The D seat lower beam 64 is formed in a substantially squarish U shape open toward the upper side in the vehicle upper and lower direction. Furthermore, a flange 64A for joining is formed on the front side of the D seat lower beam 64 in the vehicle front and rear direction.

The flange 63A of the D seat upper beam 63 and the flange 64A of the D seat lower beam 64 are overlapped and joined to each other by welding or the like. Furthermore, a rear wall 63B of the D seat upper beam 63 and a rear wall 64B of the D seat lower beam 64 are overlapped and joined to each other by welding or the like. As a result, in an area of the second D seat rear beam 62 where the D seat upper beam 63 and the D seat lower beam 64 overlap, a closed cross-sectional structure is formed by these members.

Figure 11:
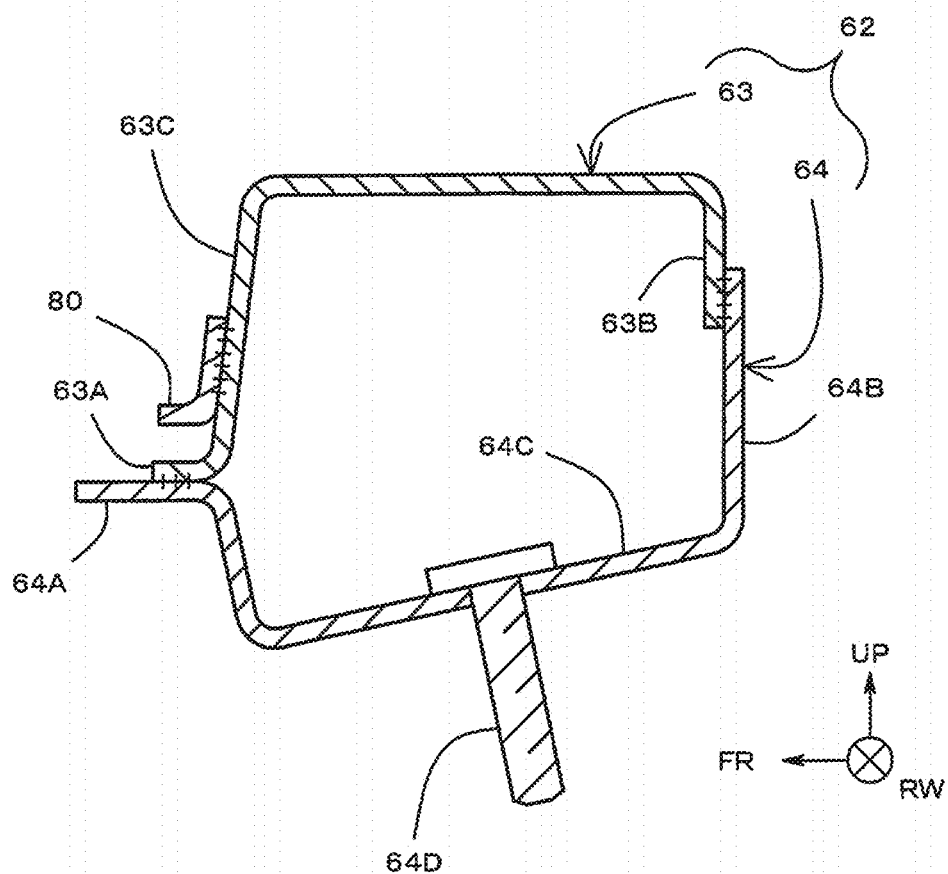
FIG. 11 is a cross-sectional view taken along line E-E in FIG. 2.

FIG. 11 is an exemplary cross-sectional view (cross-sectional view taken along line E-E in FIG. 2) of a portion of the second D seat rear beam 62 extending in the vehicle width direction. The steering bracket 80 has a rear end portion joined to a front wall 63C of the D seat upper beam 63 by welding or the like. Furthermore, the stud bolt 64D is provided through a lower wall 64C of the D seat lower beam 64.

<Structure Around Floor Brace>

Figure 13:
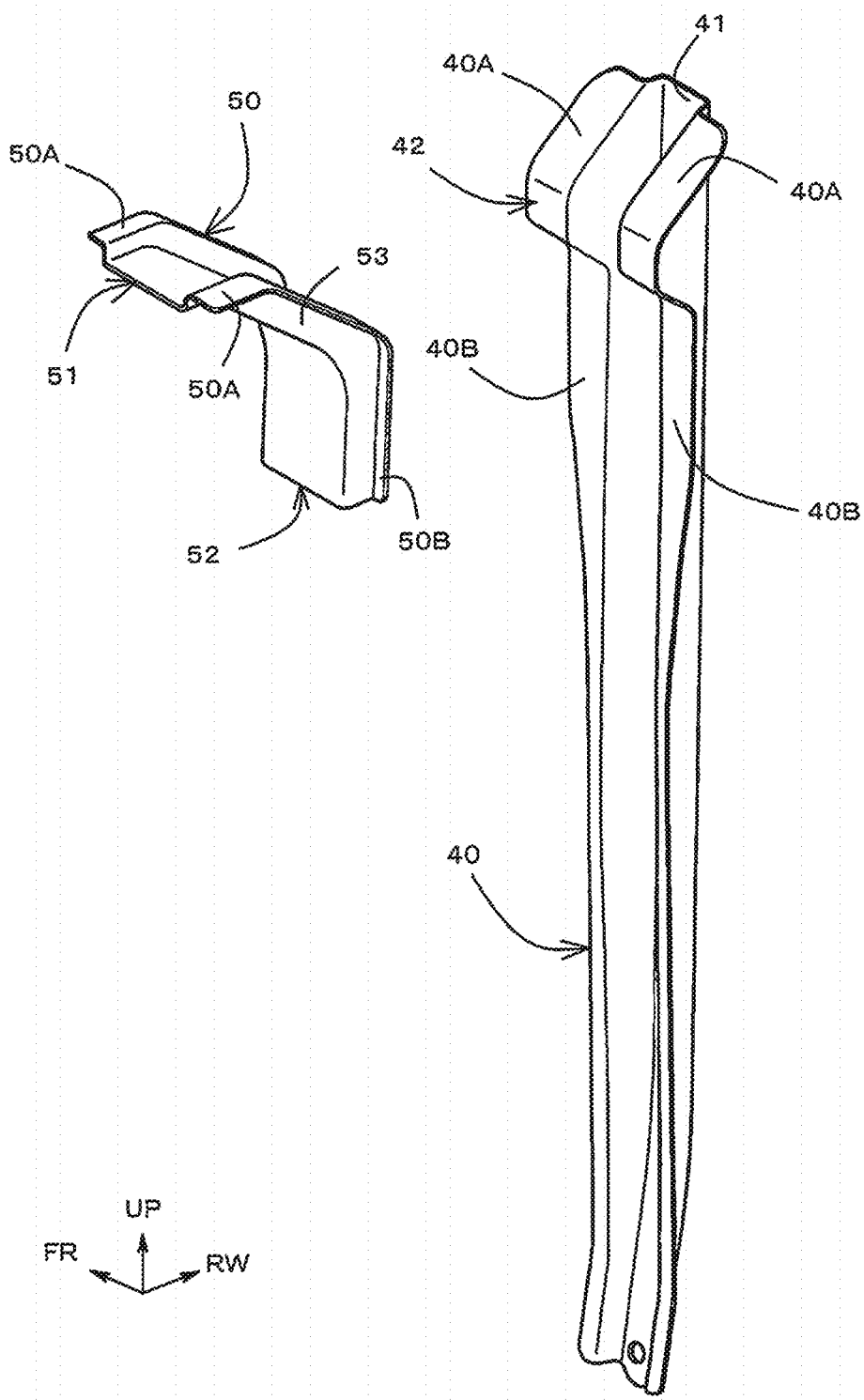
FIG. 13 is an exploded perspective view illustrating a floor brace and a gusset in the steering support structure according to the present embodiment.

The structure around the floor brace 40 will be described with reference to FIGS. 12 to 19. FIG. 13 is an exploded perspective view of the floor brace 40 and the gusset 50. Referring to FIG. 1, the floor brace 40 is a reinforcing member extending in the vehicle upper and lower direction, and has a ridgeline, where a load is mainly received (strut), extending in the vehicle upper and lower direction. The floor brace 40 has an upper end fixed to the D seat upper beam 63 of the second D seat rear beam 62 and the P seat beam 20. The floor brace 40 has a lower end fixed to a side wall 106A of a floor tunnel 106 serving as a floor member.

Referring to FIGS. 12 and 13, the floor brace 40 has a hat-shaped cross section (FR-RW cross section) in a direction orthogonal to the direction in which the floor brace 40 extends; that is, the vehicle upper and lower direction, and includes vertical flanges 40B, 40B corresponding to brim portion of the hat shape. The vertical flanges 40B, 40B have their joint surfaces facing the vehicle width direction, and extend in the vehicle upper and lower direction.

Furthermore, at an upper end of the floor brace 40 in the vehicle upper and lower direction, an upper end portion 42 projects in the vehicle width direction beyond other lower portions. The upper end portion 42 has inclined surfaces on both ends in the vehicle upper and lower direction, with the inclined surface on the upper end side serving as inclined flanges 40A, 40A. The joint surfaces of the inclined flanges 40A, 40A are inclined to extend in the vehicle upper and lower direction and toward the right side in the vehicle width direction. As described later, flange outer ends 63D2 of the D seat upper beam 63 of the second D seat rear beam 62 are joined to the inclined flanges 40A, 40A.

The second D seat rear beam 62 has an inner end of the D seat lower beam 64 in the vehicle width direction positioned further on the outer side than an inner end of the D seat upper beam 63 in the vehicle width direction. Thus, the D seat upper beam 63 extends beyond the D seat lower beam 64 toward the inner side (right side) in the vehicle width direction. This projecting extension portion 63E has a shape projecting toward the lower side in the vehicle upper and lower direction beyond the left side portion in the vehicle width direction.

As exemplarily illustrated in FIG. 12, the extension portion 63E serves as a portion where the floor brace 40 and the gusset 50 are joined. Focusing on the joint structure of the extension portion 63E and the gusset 50 in particular, the joining between these members forms a closed cross-sectional structure. With this closed cross-sectional structure, the flexural rigidity of the D seat rear beam 60 against the load input to the instrument panel reinforcement 10 in the vehicle upper and lower direction can be changed by changing the design of the gusset 50. This will be described later.

As described above, the portion of the D seat upper beam 63 joined to the D seat lower beam 64 has a substantially squarish U-shaped cross section, as exemplarily illustrated in FIG. 10. On the other hand, the extension portion 63E, of the D seat upper beam 63, projecting toward the inner side in the vertical direction beyond the inner side of the D seat lower beam 64 in the vehicle width direction has a cross section (UP-FR cross section), orthogonal to the extending direction, having a hat shape open toward the lower side as illustrated in FIG. 15 that is an exemplarily cross-sectional view taken along line F-F in FIG. 12. A flange 63D is a portion corresponding to a brim of the hat-shaped cross section.

The flange 63D is formed along the shape of the extension portion 63E. For example, a base end of the extension portion 63E; that is, a flange inner end 63D1 as a portion close to the D seat lower beam 64, extends in the vehicle width direction. Furthermore, the flange outer end 63D2 that is an end portion of the extension portion 63E in the vehicle width direction is inclined to extend toward the upper side in the vehicle upper and lower direction and the toward the right side in the vehicle width direction.

Figure 16:
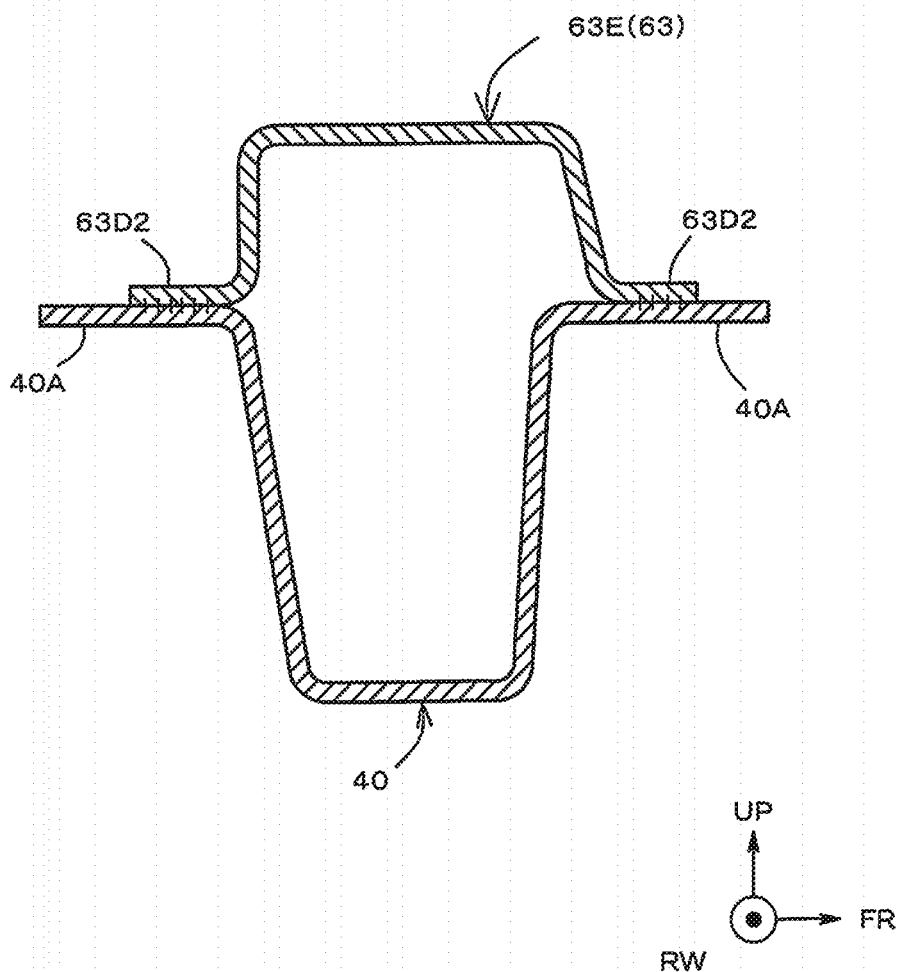
FIG. 16 is a cross-sectional view taken along line I-I in FIG. 12.

The flange outer end 63D2 is joined to the inclined flange 40A of the floor brace 40. FIG. 16 is an exemplary cross-sectional view taken along line I-I in FIG. 12. As illustrated in this figure, a closed cross-sectional structure is formed with the floor brace 40 and the extension portion 63E of the D seat upper beam 63 joined to each other at the inclined flanges 40A and the flange outer ends 63D2. The floor brace 40 has a hat-shaped cross section open toward the upper side. The extension portion 63E has a hat-shaped cross section open toward the lower side.

The flange inner end 63D1 is joined to an upper flange 50A of the reinforcement joint portion 51 of the gusset 50. This joint structure will be described later.

Figure 14:
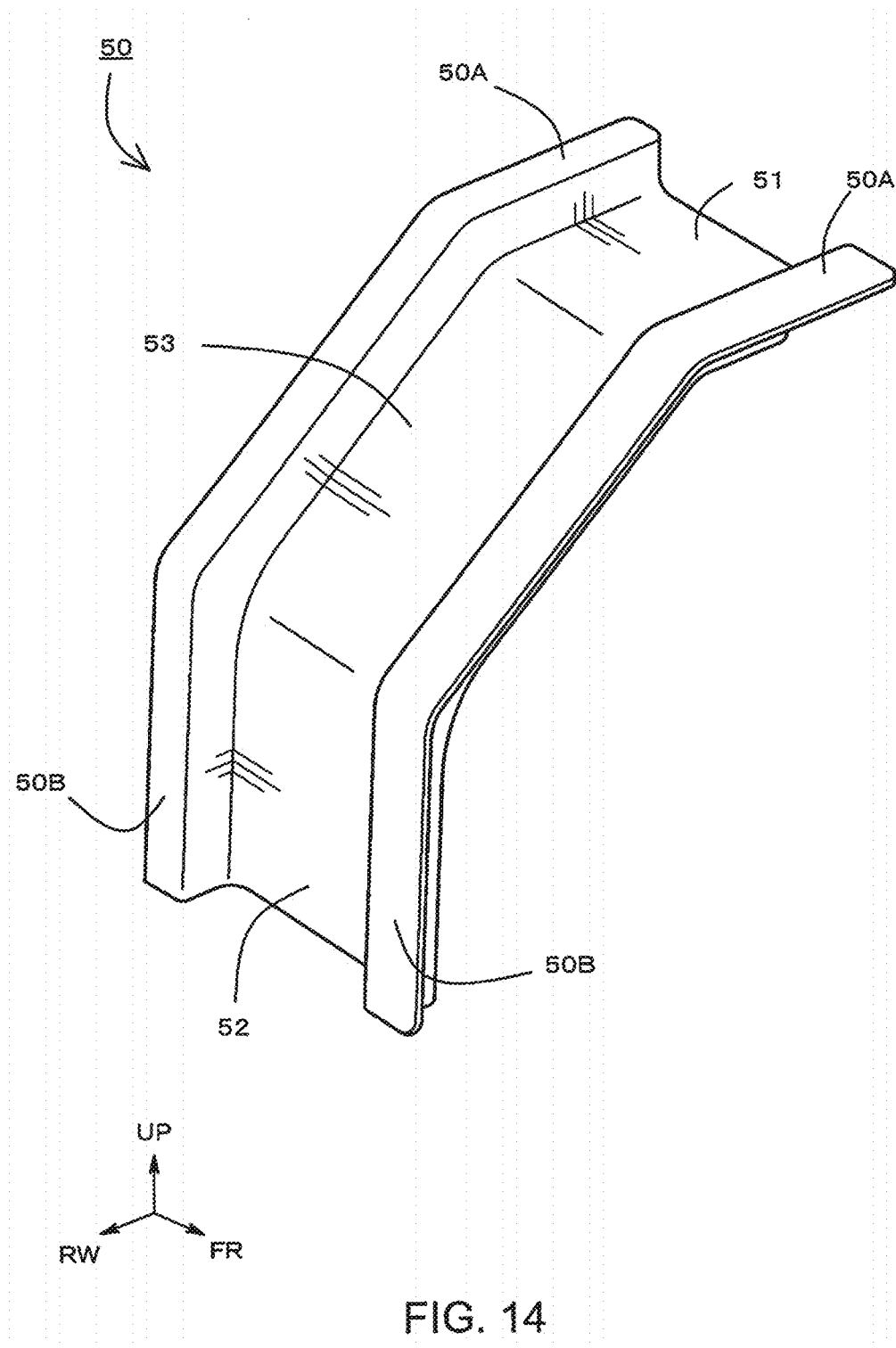
FIG. 14 is a perspective view illustrating only the gusset with a viewing angle shifted by 180 degrees from that in FIG. 13 about an UP axis.

Referring to FIGS. 12-14, the gusset 50 is a diagonal member joined to the D seat upper beam 63 of second D seat rear beam 62 and the floor brace 40. The gusset 50 is a reinforcing member for suppressing deformation of the rear view T-shaped frame composed of the instrument panel reinforcement 10 and the floor brace 40. For example, the gusset 50 is used as a reinforcing member for resisting loads in the vehicle width direction and in the vehicle upper and lower direction input to the rear view T-shaped frame structure composed of the instrument panel reinforcement 10 and the floor brace 40. The gusset 50 is obtained by bending a plate material with a hat-shaped cross section, and includes the reinforcement joint portion 51, an intermediate portion 53, and a brace joint portion 52 that are distinguished from each other with the bent portions serving as boundaries.

Figure 19:
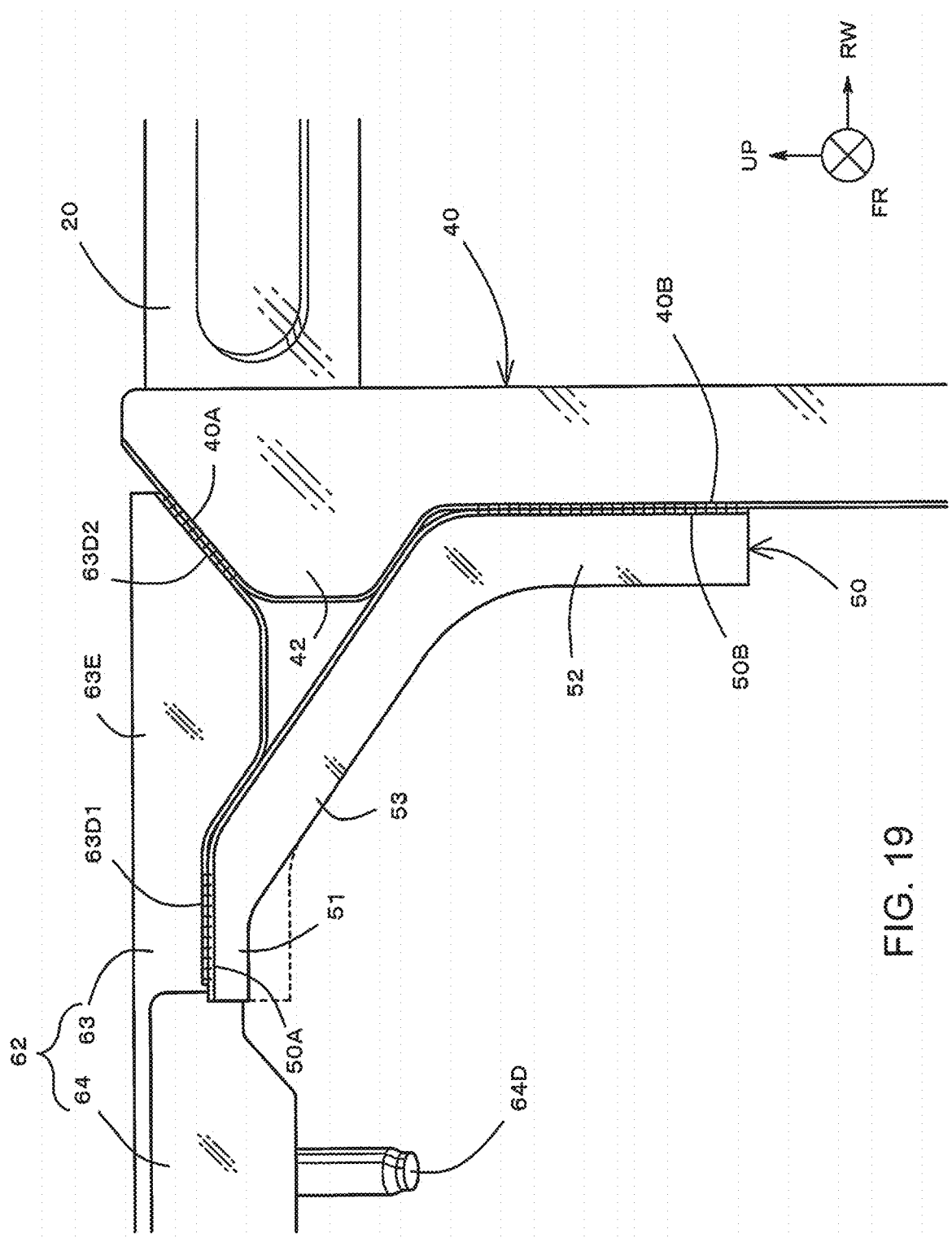
FIG. 19 is a rear view exemplarily illustrating a portion where the second D seat rear beam, the floor brace, and the gusset are joined to each other.

Referring to FIG. 19, the reinforcement joint portion 51 and the brace joint portion 52 are extended such that their extension lines orthogonally cross each other. The intermediate portion 53 connects the reinforcement joint portion 51 and the brace joint portion 52 to each other, and is inclined to extend in the vehicle width direction and in the vehicle upper and lower direction.

The reinforcement joint portion 51, the brace joint portion 52, and the intermediate portion 53 have different extension angles. If portions where these portions are connected are corner portions, the corner portions might receive stress in a concentrated manner to be buckling starting points. Thus, as illustrated in FIG. 19, the portions where the reinforcement joint portion 51, the brace joint portion 52, and the intermediate portion 53 are connected to each other are formed to have a curved shape. With the connected portions thus curved to have no corners, stress can be dispersed.

The brace joint portion 52 extends in the vehicle upper and lower direction at the time of joining. The lower flange 50B of the brace joint portion 52, corresponding to the brim portion of the hat-shaped cross section, extends in the vehicle upper and lower direction, and is joined to the vertical flange 40B of the floor brace 40 similarly extending in the vehicle upper and lower direction.

Figure 17:
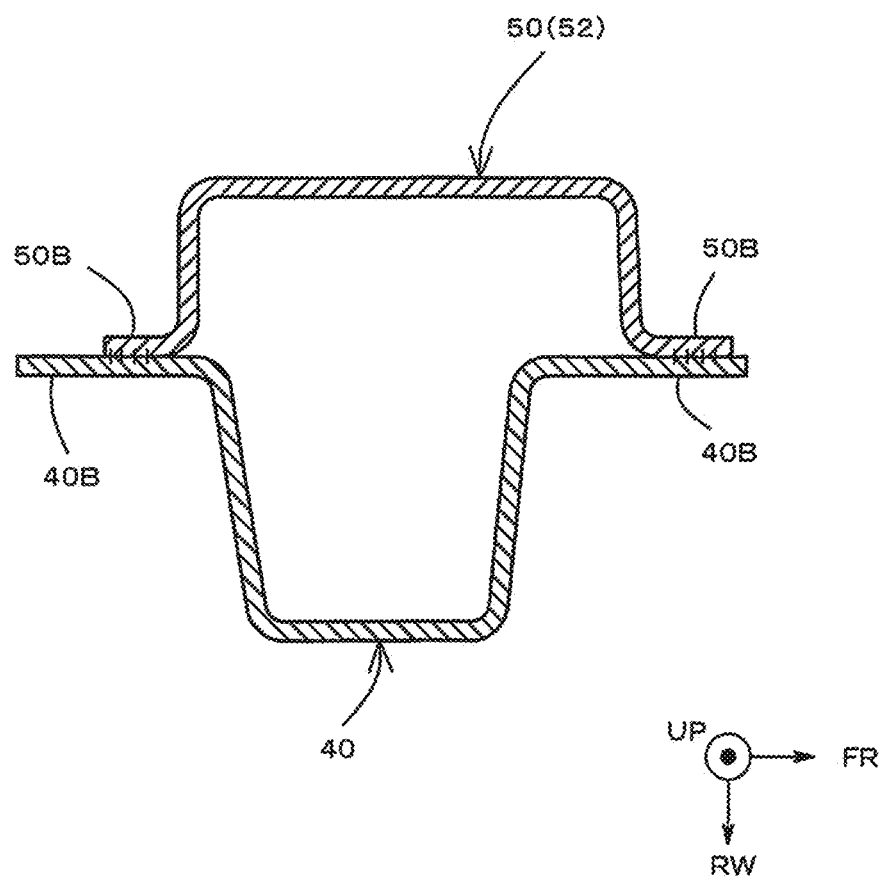
FIG. 17 is a cross-sectional view taken along line J-J in FIG. 12.

FIG. 17 is an exemplary cross-sectional view taken along line J-J in FIG. 12. Referring to this figure, the lower flanges 50B, 50B provided at the brace joint portion 52 having a hat-shaped cross section open toward the right side in the vehicle width direction (the positive direction of the RW axis), and the vertical flanges 40B, 40B provided to the floor brace 40 having a hat-shaped cross section open toward the left side in the vehicle width direction, are overlapped and joined to each other while facing each other. Thus, a closed cross-sectional structure is formed.

Referring to FIG. 12, the reinforcement joint portion 51 extends in the vehicle width direction at the time of joining. The upper flange 50A of the reinforcement joint portion 51 corresponding to the brim portion of the hat-shaped cross section extends in the vehicle width direction, to face and to be joined to the flange inner end 63D1 of the D seat upper beam 63 similarly extending in the vehicle width direction.

FIG. 15 is an exemplary cross-sectional view taken along line F-F in FIG. 12. As illustrated in this figure, a closed cross-sectional structure is formed with the reinforcement joint portion 51 of the gusset 50 having a hat-shaped cross section open toward the upper side and the extension portion 63E of the D seat upper beam 63 joined to each other at the upper flanges 50A, 50A and the flange inner ends 63D1, 63D1.

Figure 18:
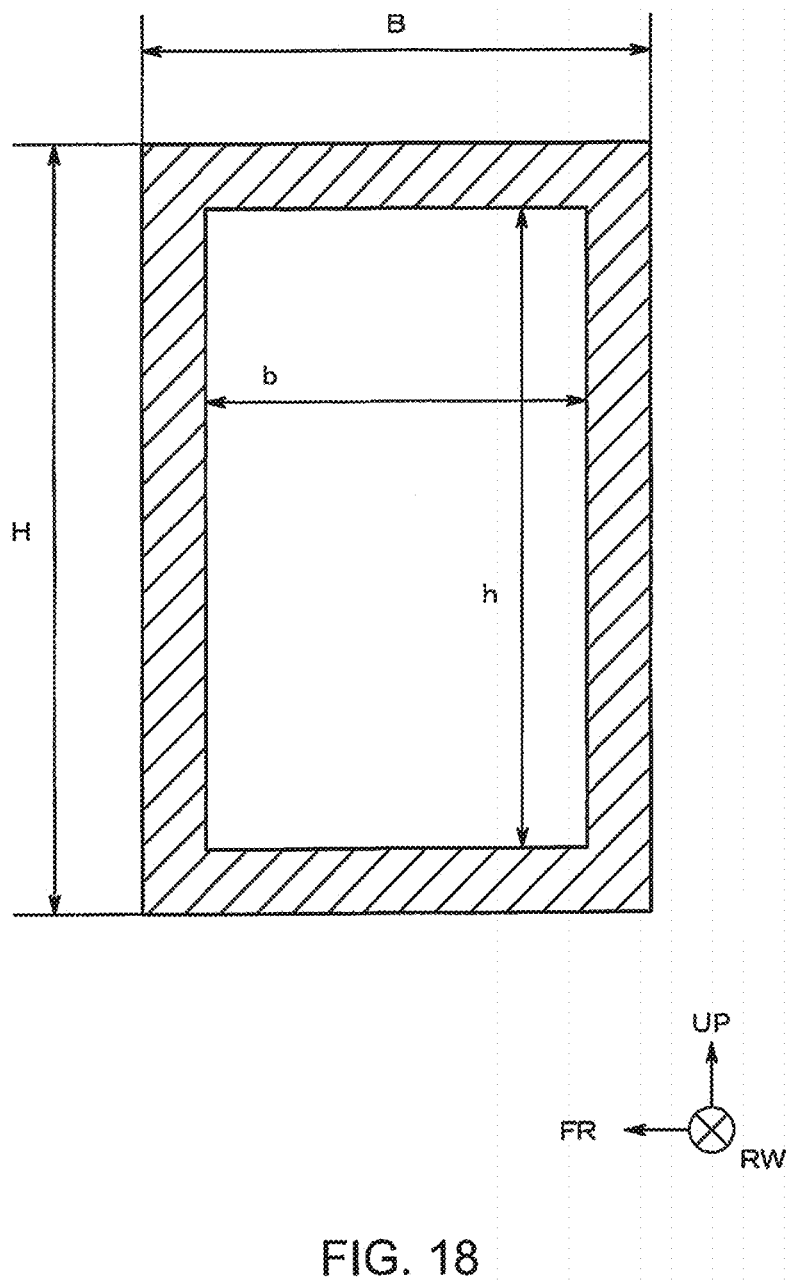
FIG. 18 is a view for explaining a moment of inertia of the area of a hollow rectangle.

With the closed cross-sectional structure illustrated in FIG. 15 that is a cross-sectional view taken along line F-F, the flexural rigidity against a load in the vehicle upper and lower direction can be changed by merely changing the design of the reinforcement joint portion 51 of the gusset 50. FIG. 18 illustrates an example of a hollow rectangle similar to the closed cross-sectional structure illustrated in FIG. 15 that is a cross-sectional view taken along line F-F. The following formula (1) represents the amount of deformation (the amount of bending) due to a load applied in the vehicle upper and lower direction.

[Formula 1]

$$v = \frac{FL^3}{3EI} \quad (1)$$

In Formula (1), v is a deformation amount, F is a load, L is a length in the RW axis direction, E is a longitudinal elastic modulus, and I is a moment of inertia of area. The following formula (2) represents the moment I of inertia of area of the hollow rectangle.

[Formula 2]

$$I = \frac{1}{12}(BH^3 - bh^3) \quad (2)$$

Here, assuming that the thickness a of the upper wall and the lower wall is a=H−h, Formula (2) can be modified to be the following Formula (3).

[Formula 3]

$$I = \frac{1}{12}\{(B-b)H^3 + 3H^2ab - 3Ha^2b + a^3b\} \quad (3)$$

If the height H of the hollow rectangle is changed without changing the thickness a=H−h and the thickness (B−b) of both side walls in Formula (3), the moment of inertia of area I increases, as is clear from the sum of cubic and square terms of H. Referring to Formula (1), the deformation amount v decreases as the moment of inertia of area I, which is a denominator component of the formula, increases. Thus, the flexural rigidity of the hollow rectangle is improved by changing the height H of the hollow rectangle without changing the thicknesses.

Referring to FIG. 15, the flexural rigidity of D seat rear beam 60 is improved by increasing the flexural rigidity of the closed cross-sectional structure illustrated in the figure. Referring to FIG. 15, flexural rigidity against a load in the vehicle upper and lower direction (vertical load) can be increased by increasing the height of the closed cross-sectional structure illustrated in the figure, in the vehicle upper and lower direction.

For example, as exemplarily indicated by the broken line in FIG. 19, by increasing the height of the reinforcement joint portion 51 of the gusset 50 in the vertical direction, the flexural rigidity of the closed cross-sectional structure illustrated in FIG. 15 against a load in the vehicle upper and lower direction is improved.

As described above, with the steering support structure according to the present embodiment, flexural rigidity of the D seat rear beam 60 against a load in the vehicle upper and lower direction can be improved by merely changing the design of the gusset 50 that serves as a diagonal member and is a relatively small member in the components of the structure.

Thus, the allowable amount of bending deformation of the D seat rear beam 60 due to a load in the vehicle upper and lower direction varying among vehicle models can be satisfactory set among the vehicle models, merely by changing the design of the gusset 50; that is, without making changes in the components of the steering support structure other than the gusset 50. Thus, the steering support structure according to the present embodiment enables the parts to be shared as much as possible among a plurality of vehicle models different from each other in an allowable amount of bending deformation of the instrument panel reinforcement in the vehicle upper and lower direction (vertical direction).

For some models, the allowable amount of bending deformation of the D seat rear beam 60 due to a load in the vehicle upper and lower direction may be satisfactory set even when the height H of the hollow rectangle is low; that is, even when the height of the hat-shaped cross section of the reinforcement joint portion 51 is zero. Similarly, for some models, the allowable amount of bending deformation of the floor brace 40 due to a load in the vehicle width direction of the floor brace 40 may be satisfactory set even when the height of the hat-shaped cross section of the brace joint portion 52 is zero. In these cases, the gusset 50 does not have to have a hat-shaped cross section as exemplarily illustrated in FIG. 14, and may be a flat plate member including the reinforcement joint portion 51, the brace joint portion 52, and the intermediate portion 53.

<Another Example of Instrument Panel Reinforcement According to the Present Embodiment>

Figure 20:
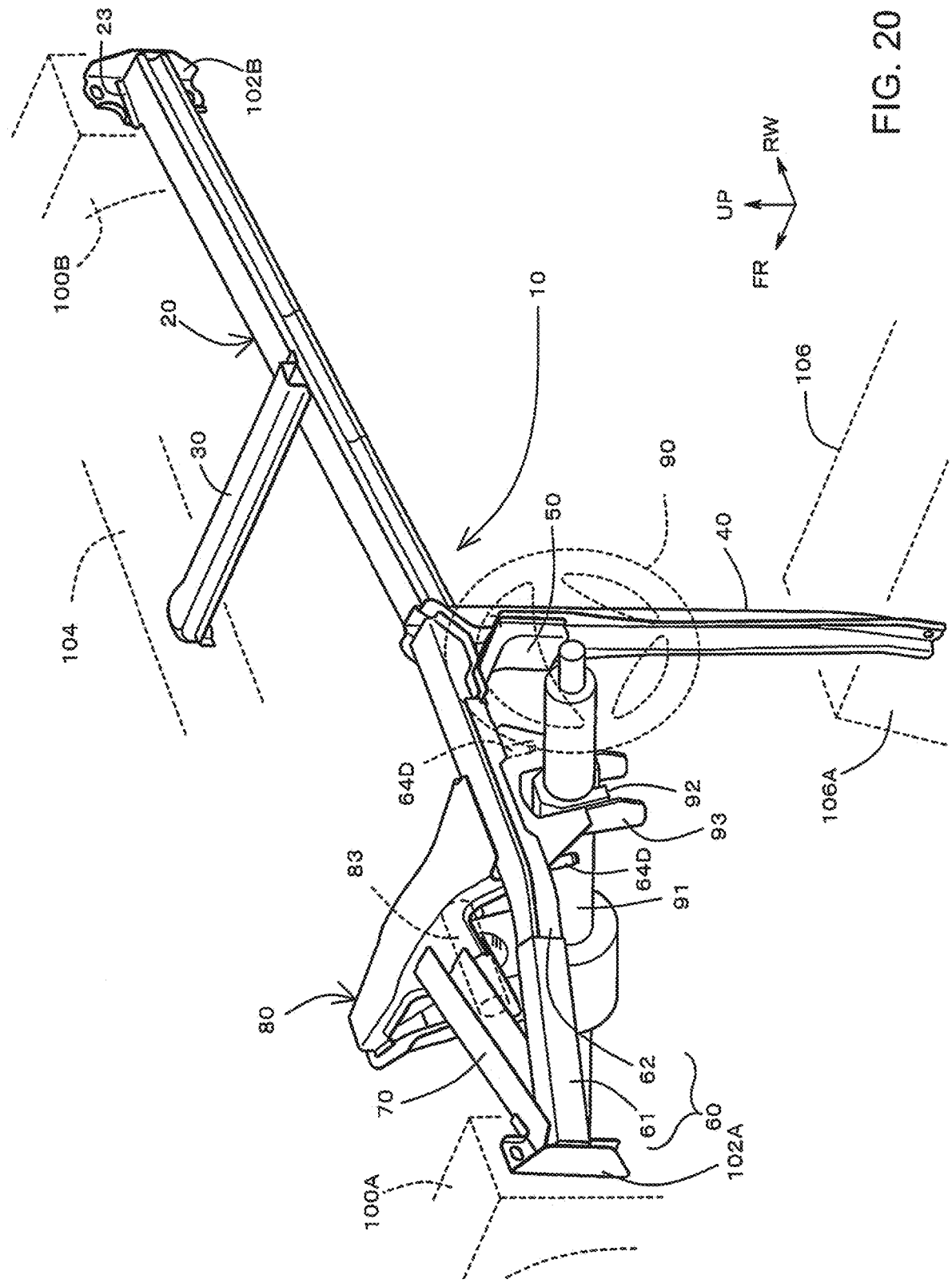
FIG. 20 is a diagram illustrating another embodiment of the steering support structure according to the present embodiment.
Figure 21:
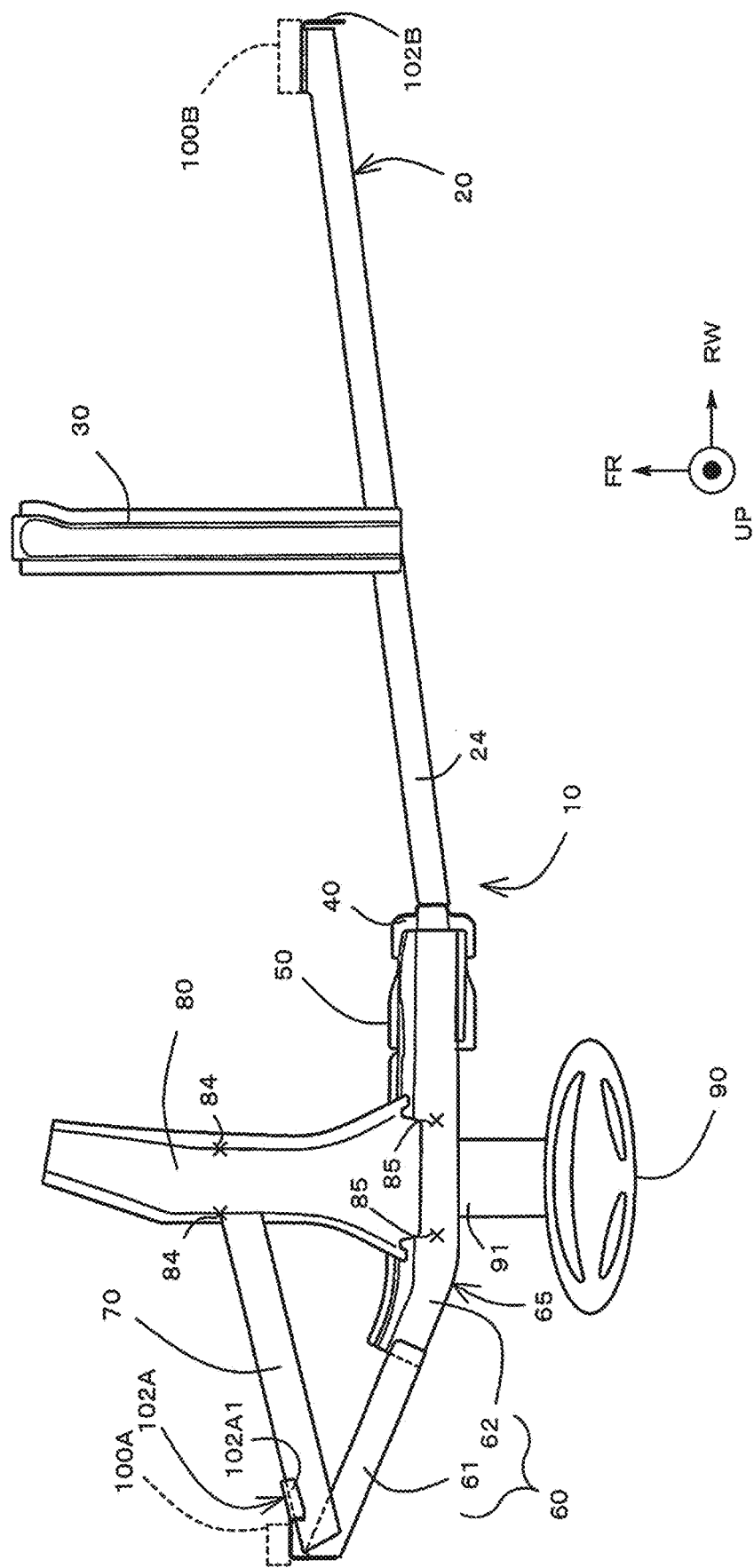
FIG. 21 is a plan view of the example illustrated in FIG. 20.
Figure 22:
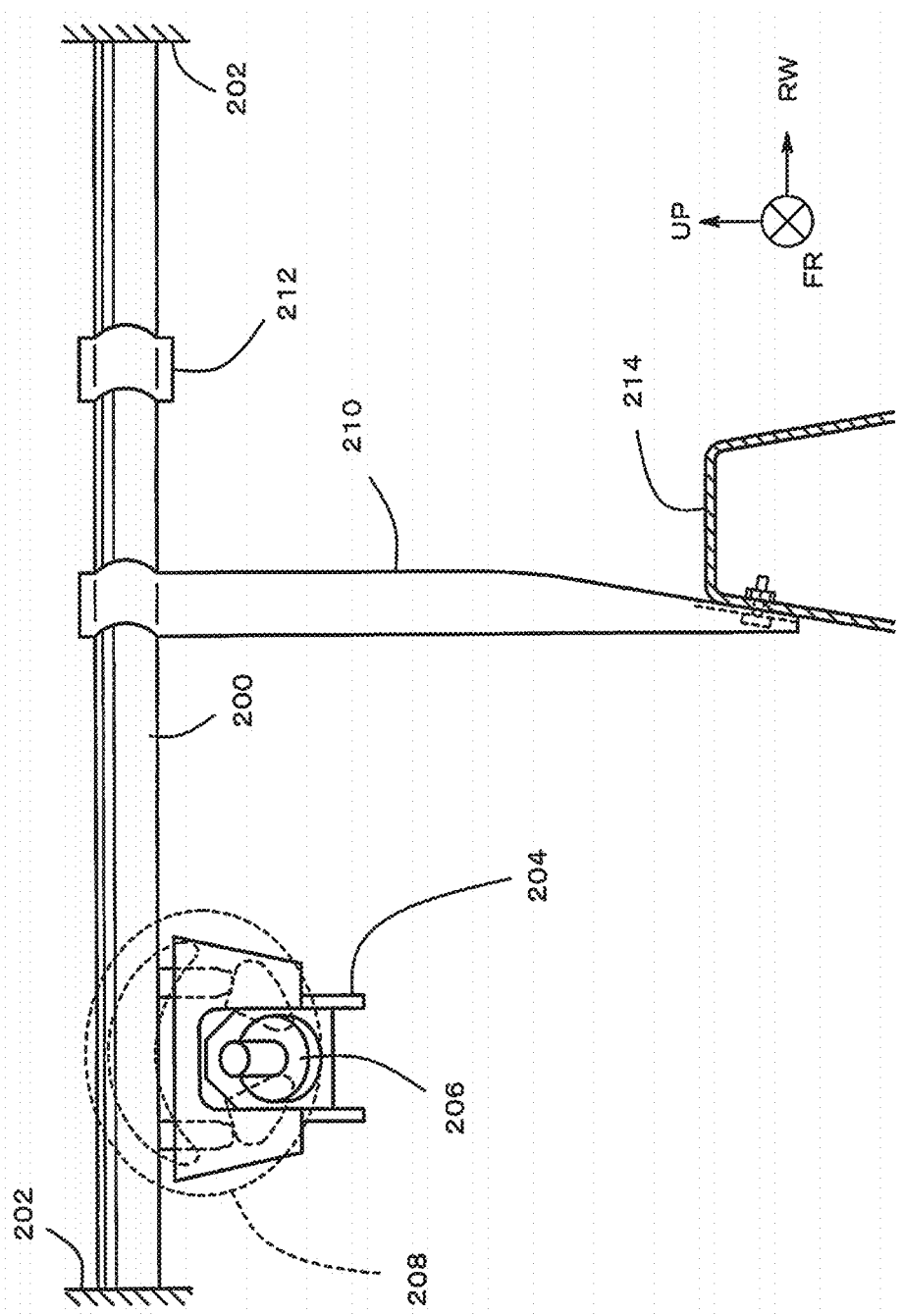
FIG. 22 is a rear view illustrating a conventional steering support structure.
Figure 23:
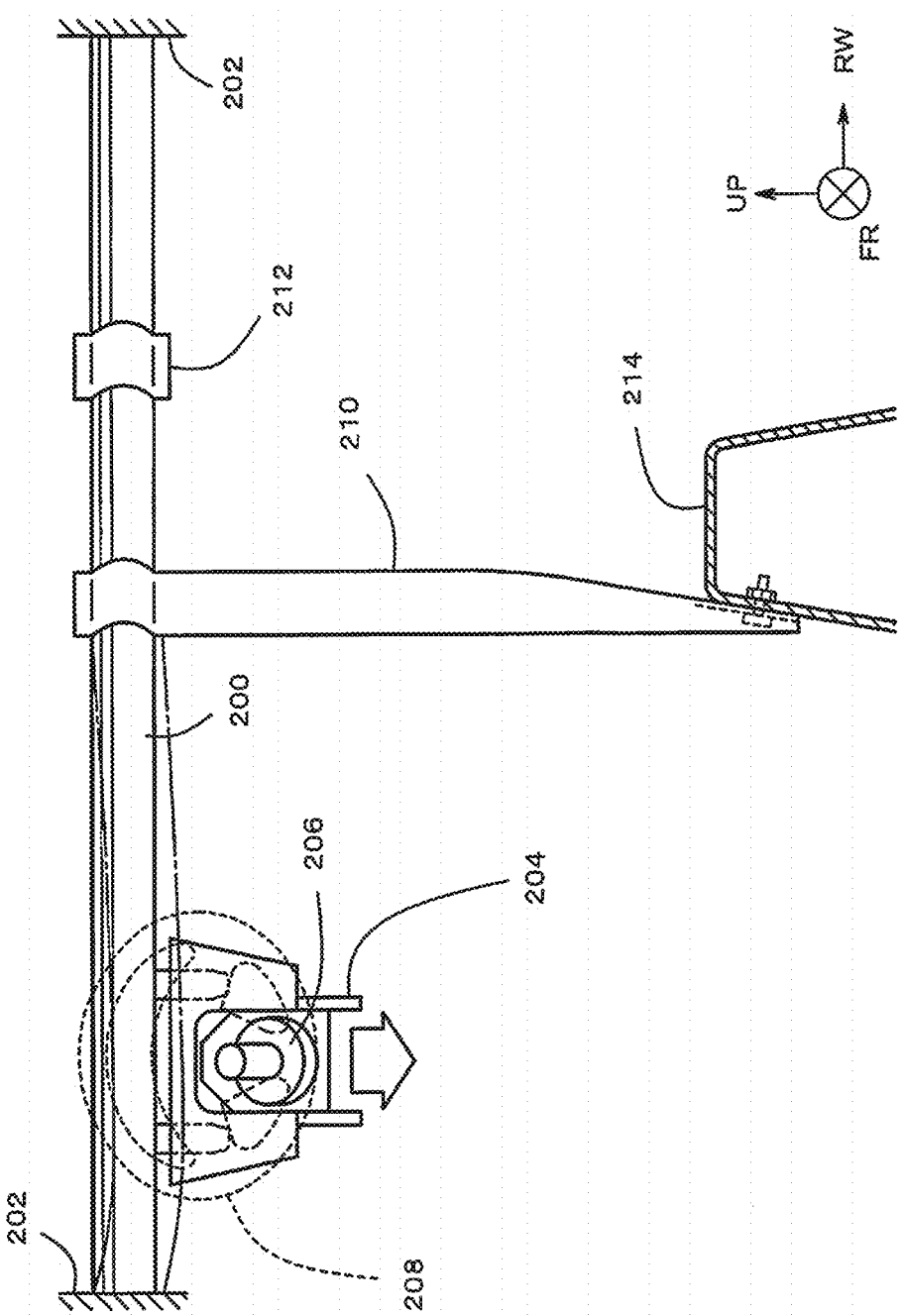
FIG. 23 is a rear view illustrating a state where a vertical load is input to the conventional steering support structure.

FIGS. 20 and 21 illustrate another example of the steering support structure according to the present embodiment. The steering support structure according to this other example is different from the steering support structure exemplarily illustrated in FIGS. 1 and 2 in the shape of the P seat beam 20.

Specifically, while the shape of the P seat beam 20 in FIG. 2 is a curved shape including the bent portion 26 in plan view, the P seat beam 20 illustrated in FIG. 21 has a linear shape in plan view. More specifically, the P seat beam 20 has an inner end in the vehicle width direction joined to the floor brace 40, linearly extends in an inclined manner, from the joined portion, toward the outer side in the vehicle width direction and toward the front side in the vehicle front and rear direction, and has an outer end in the vehicle width direction joined to the front pillar bracket 102B.

With such a linear P seat beam 20, the instrument panel reinforcement 10 can withstand (strut) the load from the steering wheel 90 in the vehicle width direction.

The present disclosure is not limited to the present embodiments described above, and includes all changes and modifications without departing from the technical scope or the essence of the present disclosure defined by the claims.

The invention claimed is:

1. A steering support structure comprising:
   an instrument panel reinforcement that supports a steering column and has both ends in a vehicle width direction fixed to frame members of a vehicle;
   a floor brace that extends in a vehicle upper and lower direction, and has an upper end joined to the instrument panel reinforcement and a lower end joined to a floor member; and
   a gusset that is a diagonal member joined to the instrument panel reinforcement and the floor brace,
   wherein the instrument panel reinforcement includes a driver's seat rear beam extending from a portion to be joined to the floor brace to a portion for supporting the steering column,
   wherein the driver's seat rear beam includes a driver's seat upper beam having a hat-shaped cross section open toward a lower side, and
   wherein the gusset includes a reinforcement joint portion that is joined to the driver's seat upper beam to form a closed cross section.

2. The steering support structure according to claim 1, wherein the gusset further includes
   a brace joint portion that extends in the vehicle upper and lower direction and is joined to the floor brace, and
   an intermediate portion that connects the reinforcement joint portion and the brace joint portion to each other and is inclined to extend in the vehicle width direction and the vehicle upper and lower direction, and
   wherein a portion where the intermediate portion and the brace joint portion are connected to each other has a curved shape.

3. The steering support structure according to claim 1, wherein the reinforcement joint portion has a hat-shaped cross section open toward an upper side.

4. The steering support structure according to claim 2, wherein the reinforcement joint portion has a hat-shaped cross section open toward an upper side.

* * * * *